April 23, 1957 G. C. MERRITT 2,789,538
ANIMAL RESTRAINING DEVICE
Filed Aug. 9, 1955 3 Sheets-Sheet 1

Gerald C. Merritt
INVENTOR.

BY
Attorneys

April 23, 1957  G. C. MERRITT  2,789,538
ANIMAL RESTRAINING DEVICE
Filed Aug. 9, 1955  3 Sheets-Sheet 2
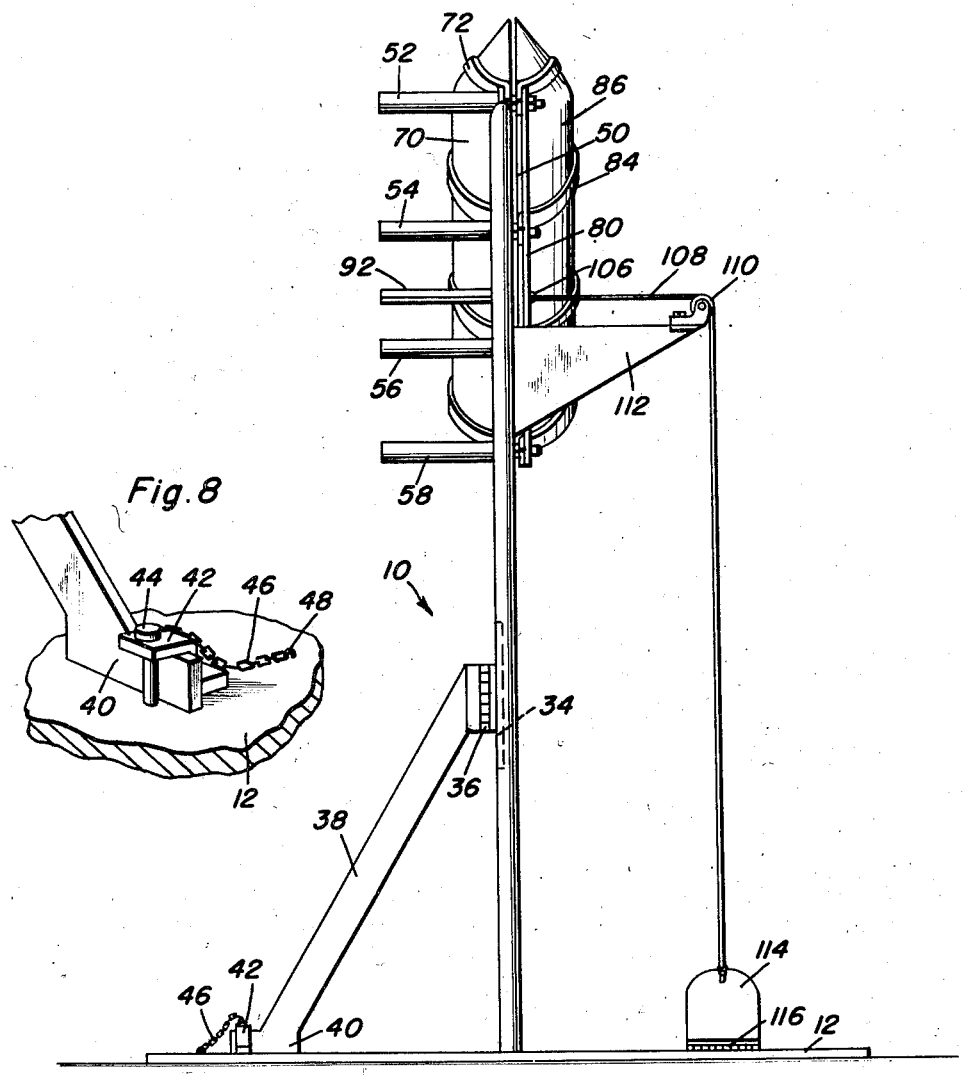
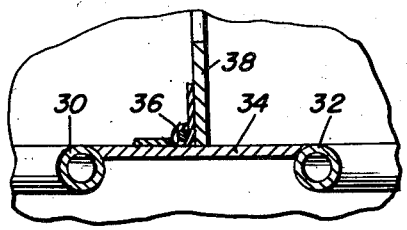
Gerald C. Merritt
INVENTOR.

April 23, 1957 G. C. MERRITT 2,789,538
ANIMAL RESTRAINING DEVICE
Filed Aug. 9, 1955 3 Sheets-Sheet 3
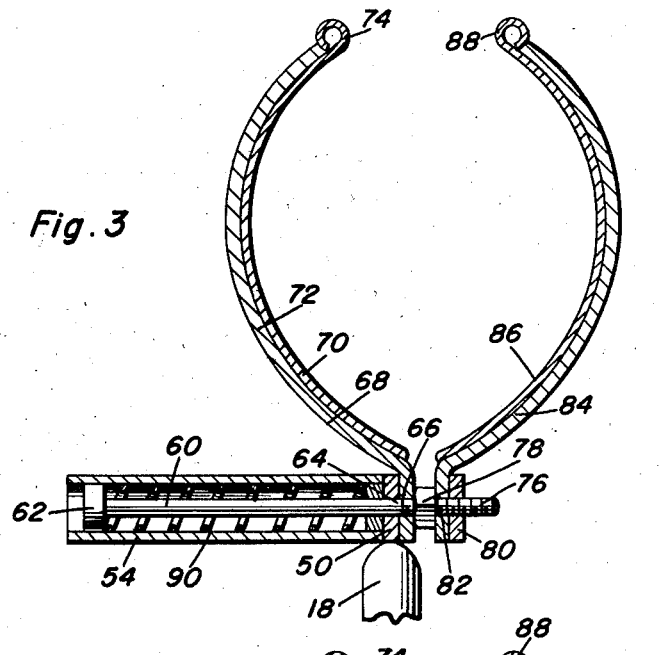
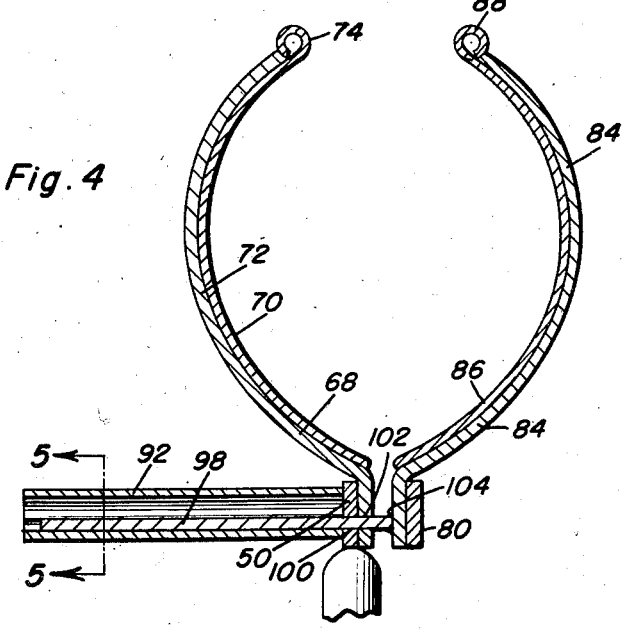
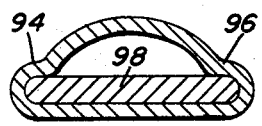
Gerald C. Merritt
INVENTOR.

United States Patent Office 2,789,538
Patented Apr. 23, 1957

2,789,538

ANIMAL RESTRAINING DEVICE

Gerald C. Merritt, Baltimore, Ohio

Application August 9, 1955, Serial No. 527,194

2 Claims. (Cl. 119—103)

This invention relates to the class of animal husbandry and more particularly to a novel animal restraining device.

The primary object of the present invention resides in the provision of an animal restraining device adapted to conveniently support and restrain an animal such as a small pig or the like, while performing certain operations such as castration or otherwise treating the animal thereby preventing the possibility of injury to the veterinary or farmer using the invention, while also assuring that proper techniques may be used during the operation.

A further object of the invention resides in the provision of an animal restraining device that is easily collapsed and capable of being stored in a very small space when not in use.

The construction of this invention features novel animal engaging shells which are secured to suitable frame members carried by a support which is collapsibly secured to a base plate. Means are provided for resiliently urging the shells together to securely though resiliently hold a pig or other animal therein and which animal restraining device is pedal operated to permit removal of the animal after the operation has been performed thereon.

Still further objects and features of this invention reside in the provision of an animal restraining device that is simple in construction, highly efficient in operation, and inexpensive to manufacture thereby permitting wide use and distribution.

These, together with the various ancillary objects and features of the invention which will become apparent as the following description proceeds, are attained by this animal restraining device, a preferred embodiment of which has been illustrated in the accompanying drawings, by way of example only, wherein:

Figure 2 is a front elevational view of this animal restraining device and illustrating in particular the relative arrangement of the parts incorporated in the invention;

Figure 3 is an enlarged sectional detailed view as taken along the plane of line 3—3 in Figure 1 and illustrating in particular the resiliently urged plungers forming important elements of the invention;

Figure 4 is an enlarged sectional detailed view as taken along the plane of line 4—4 in Figure 1 and illustrating in particular the construction of the guide tube and guide slidably constrained;

Figure 5 is an enlarged sectional view as taken along the plane of line 5—5 in Figure 4;

Figure 6 is an enlarged horizontal sectional view as taken along the plane of line 6—6 in Figure 1;

Figure 8 is an enlarged perspective detail view illustrating the manner in which the brace may be secured to the base plate.

Figure 1:
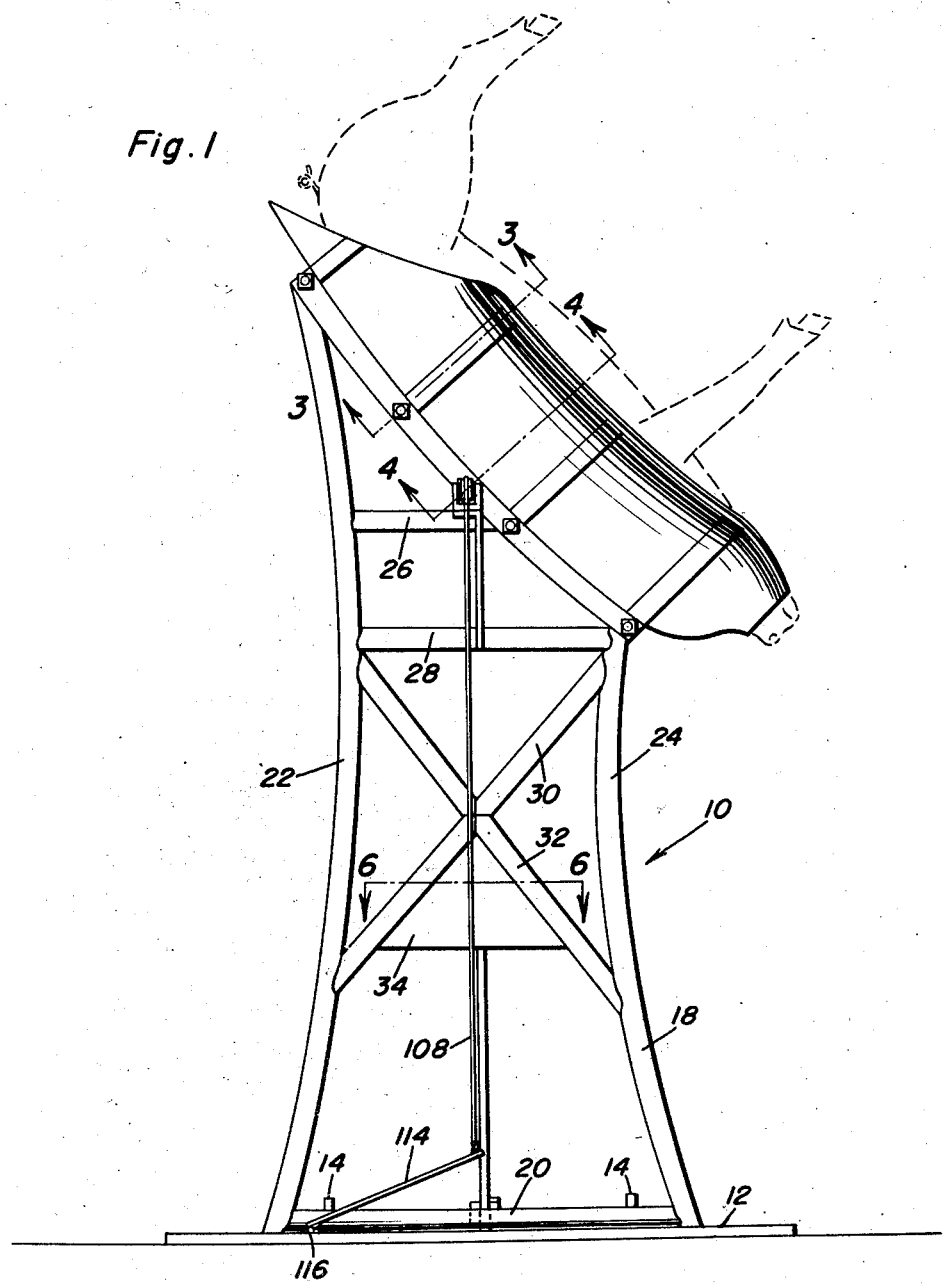
Figure 1 is a side elevational view of the animal restraining device comprising the present invention.
Figure 7:
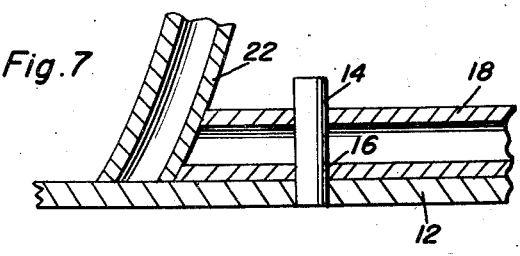
Figure 7 is an enlarged sectional detail view illustrating the manner in which the support may be pinned to the base plate.

With continuing reference to the accompanying drawings wherein like reference numerals designate similar parts throughout the various views, and with initial attention directed to Figures 1 and 2, reference numeral 10 is used to generally indicate and designate the animal restraining device comprising the present invention. This animal restraining device 10 includes a base plate 12 having pins 14 rising therefrom as can be best seen in Figure 7. The pins 14 extend upwardly through apertures as at 16 in the bottom brace 20 of a tubular support generally indicated at 18 the construction of which may be of any suitable material such as metal, wood or the like. The support 18 may also include two arcuate tubular members 22 and 24, horizontal braces 26, 28, and diagonal braces 30 and 32 and, of course, various other shapes as desired may be utilized within the concepts of this invention.

Hingedly secured to a point 34, welded or otherwise secured to the braces 30 and 32 by means of a hinge 36 is a brace 38, the lower end of which is provided with a foot section 40 engageable within the confines of a substantially Z-shaped bracket 42, welded or otherwise attached to the base plate 12, the foot 40 being confined by a pin 44 which may be attached to a chain 46 anchored to the base plate 12 by any convenient means such as a U-shaped staple 48 or the like. The brace 38 thereby serves to hold the support 18 erect.

Preferably welded to the frame 18 at the upper portion thereof is a first frame member which has welded thereto and extending outwardly therefrom a plurality of cylinders 52, 54, 56, and 58. As can be seen best in Figure 3, each of the cylinders 52, 54, 56 and 58 has a plunger 60 mounted therein, the plunger 60 being provided with a collar 62 on one end thereof and extending through an aperture 64 in the frame 50 and through a suitable aperture 66 in the framework 68 of a first animal engaging shell 70, the framework 68 including spaced ribs 72. The shell 70 may be provided with an upper arcuate edge 74 for preventing injury to a pig or other animal to be disposed in the animal restraining device by eliminating any sharp edges.

The plungers 60 may have threaded ends as at 76 and nuts 78 are threadedly engaged thereon for holding the plungers 60 in suitable adjusted position within the cylinders 52, 54, 56 and 58. Furthermore, the threaded ends 76 of the plungers 60 may be threadedly engaged in a second frame member 80 and in an aperture 82 in the framework 84 of a second animal engaging shell 86 also provided with a curved upper edge portion 88.

Springs 90 are disposed in the cylinders 52, 54, 56 and 58 and engage the collars 62 to continuously urge the plungers to be extended within the respective cylinders and to thereby urge the second body shell 86 toward the first body shell 70.

There is also welded to the first frame member 50 a guide tube 92 having depressed side portions 94 and 96, see Figure 5, which constrain the movement of a guide bar or rod 98 to sliding movement only, the guide rod 98 extending through an aperture 100 in the frame member 50 and an aperture 102 in the framework 68 and being welded as at 104 to the framework 84 of the shell 86, the framework 84 being secured to the frame member 80 and thus affixing the guide bar or rod 98 to the frame member 80.

Affixed to a suitable eye 106 on the frame member 80 is a cable 108 which is entrained about a pulley 110 carried by a suitable plate 112 welded or otherwise affixed to the frame 18. The cable 108 is affixed to the upper portion of a pedal 114, which may be hinged at 116 to the base plate 12 or, if desired, may be attached to or secured as by any suitable hinge or the like, to support 18, if so desired.

The operation of this animal restraining device is quite simple. After the animal has been lifted to a suitable height, the body shell 86 may be opened by depressing the pedal 114 which will cause the cable 108 to pull on the frame 80 and thereby compress the springs 90 to pull apart the body shell 86 from the body shell 70. Then, the pig or other animal may be lowered into the space between the body shells and the pedal 114 released at which time the shells will engage the body of the animal to be restrained therein. After the necessary operation has been performed, the pedal 114 may be depressed and the animal lowered.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An animal restraining device comprising a support, a first frame member carried by said support, a first animal engaging shell secured to said first frame member, cylinders secured to said first frame member, plunger rods extending through said first frame member into said cylinders, a second frame member having a second animal engaging shell secured thereto, said plunger rods being secured to said second frame, springs engaging said plunger rods in said cylinders to urge said first and second shells toward each other, and means for drawing said second shell away from said first shell, said means including a cable attached to said second frame member, a pedal, said cable being connected to said pedal.

2. An animal restraining device comprising a support, a first frame member carried by said support, a first animal engaging shell secured to said first frame member, cylinders secured to said first frame member, plunger rods extending through said first frame member into said cylinders, a second frame member having a second animal engaging shell secured thereto, said plunger rods being secured to said second frame, springs engaging said plunger rods in said cylinders to urge said first and second shells toward each other, and means for drawing said second shell away from said first shell, a guide tube attached to said first frame member, a guide rod attached to said second frame member extending through said first frame member slidably received and constrained in said guide tube, said means including a cable attached to said second frame member, a pedal, said cable being connected to said pedal.

References Cited in the file of this patent

UNITED STATES PATENTS

| 1,062,109 | Miller | May 20, 1913 |
| 1,445,487 | Clark | Feb. 13, 1923 |
| 2,319,377 | Wallace et al. | May 18, 1943 |
| 2,631,568 | Beach | Mar. 17, 1953 |